March 5, 1957
C. R. HEAD
2,784,040
RETAINING DEVICES FOR PUMP LINERS
Filed July 15, 1953
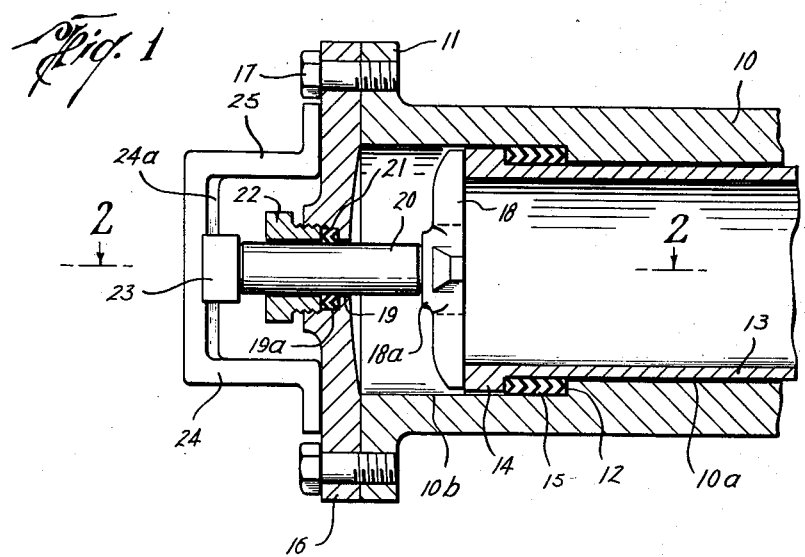
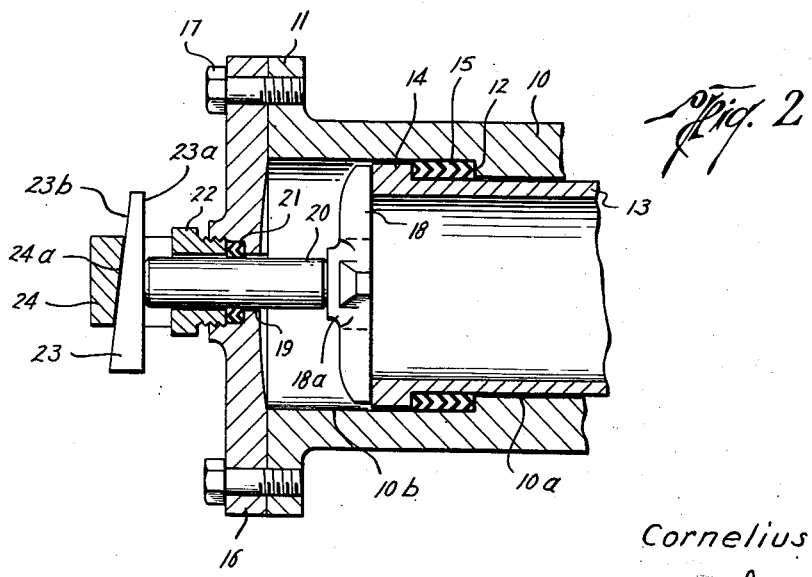
Cornelius R. Head
INVENTOR.
BY
ATTORNEYS

United States Patent Office 2,784,040
Patented Mar. 5, 1957

2,784,040

RETAINING DEVICES FOR PUMP LINERS

Cornelius R. Head, Kemah, Tex.

Application July 15, 1953, Serial No. 368,173

7 Claims. (Cl. 309—3)

This invention relates to new and useful improvements in returning devices for pump liners.

The device is particularly adapted for use for retaining a liner within the cylinder of the usual slush pump but may employed for maintaining a liner within any type of cylinder.

It has been the usual practice to employ threaded bolts for maintaining the cylinder liner in position, and it is one object of the present invention to provide a simplified retaining device which eliminates the use of threaded bolts or similar members whereby the inherent disadvantages of such members are obviated.

An important object of the invention is to provide an improved retaining device employing a cylindrical pin in combination with a wedge element, with said wedge element being readily accessible from the exterior of the cylinder so that the desired pressure which is necessary to hold the cylinder in place may be maintained against said cylinder.

Another object is to provide an improved device of the character described which permits actuation thereof to increase the applied pressure against the liner while the pump is operating and the cylinder is under pressure.

Still another object is to provide a device of the character described which makes it possible to visually determine when and if the liner being retained thereby requires further tightening.

A still further object is to provide an arrangement whereby the retaining device may be replaced without having to transport the entire cylinder head to a repair shop.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a partial longitudinal section of a pump cylinder having the improved retaining device constructed in accordance with the invention applied thereto; and Figure 2 is a longitudinal sectional view taken on the line 2—2 of Figure 1.

In the drawings the numeral 10 designates the cylinder of a slush pump, which cylinder is constructed in the usual manner and is ordinarily provided with an annular flange 11 at its end. An internal annular shoulder 12 is provided within the bore 10a of the cylinder, and the usual pump liner 13 is insertable within the bore. The pump liner is formed with an annular flange 14 which fits the counterbore portion 10b of the cylinder beyond the internal shoulder 12. When the liner 13 is positioned within the bore of the cylinder, the flange 14 is within the counterbore 10b and a suitable packing 15, which is illustrated as of the chevron type, is interposed between the flange 14 and the shoulder 12 to seal off between the exterior of the liner 13 and the bore 10a of the cylinder.

A cylinder head or plate 16 is adapted to be secured to the annular flange 11 of the cylinder by suitable bolts 17 and said plate closes the end of said cylinder. It has become prior practice to employ a cage or spider 18 for retaining the liner 13 in place within the cylinder 10 and to apply an inward pressure to said spider by means of bolts threaded through the cylinder head plate 16. Such bolts require rotation for adjustment and have been found to gall or bind in their respective threads with the result that easy replacement of the liner has been difficult.

Also, whenever the threaded bolts become inoperative repair is necessary, and this normally requires that the complete cylinder head assembly has to be transported to a suitable shop for such repair.

In a carrying out the present invention, the cylinder head or plate 16 is formed with a central axial opening 19, and a cylindrical retaining pin 20 is adapted to extend through said opening. The opening 19 is formed with a counterbore 19a which forms a packing chamber, and suitable packing 21 which is illustrated as of the chevron type is disposed within this chamber and surrounds the pin 20. A packing gland 22 is threaded into the counterbore 19a and has its inner end abutting the packing rings 21; tightening of the packing gland will obviously maintain the packing rings 21 in sealing engagement with the cylindrical pin 20.

The inner end of the retaining pin 20 is adapted to engage the central boss or portion 18a of the retaining spider or cage 18, while the outer end of the pin projects outwardly beyond the packing gland 22. The pin, of course, is slidable through the opening 19 and a seal around said pin is effected by the packing rings 21. It is preferable that the ends of the pin 20 be flat and the outer projecting end of said pin is adapted to be engaged by a locking wedge element 23. As is clearly illustrated in Figure 2, the wedge element 23 has a relatively flat surface 23a which contacts the flat end of the pin 20; the outer surface 23b of the element 23 is inclined or disposed at an angle to the surface 23a, and said inclined surface 23b coacts with the inner inclined surface 24a of a laterally extending bracket 24. The bracket 24 is formed with leg members 25 which are flanged at their lower ends and said flanged ends engage and are suitably secured to the outer surface of the cylinder head plate 16. It is evident that the bracket 24 extends diametrically with respect to the cylinder head plate and is located in spaced relation thereto. When the retaining pin 20 is inserted into position engaging the retaining cage 18, the outer end of the pin is spaced from the inner surface 24a of the bracket whereby the wedge element 23 may be interposed between the flat outer end of said pin and the inner surface of the bracket. Obviously, by driving the wedge inwardly in the manner illustrated in Figure 2, the wedge element 23 functions to urge the retaining pin inwardly of the cylinder, whereby an inward pressure is exerted against the retaining cage 18. Since the cage 18 engages the end of the liner 13, this inward pressure holds the liner in position within the cylinder 10.

The arrangement eliminates the use of any threaded bolts for the purpose of maintaining a pressure against the end of the liner 13 in order to retain the same in position within the cylinder. It is obvious that by driving the wedge element 23 inwardly maximum pressure may be applied to the cage and to the liner so that the liner is properly maintained in position. If the liner becomes loose within the cylinder 10 during operation of the pump, this fact will be indicated by visual inspection of the contact between the wedge element 23 and the outer end of the pin 20, and the operator need only impart a blow to the wedge element in order to tighten the wedge between the bracket and the pin. It is pointed out that during use, that is, during operation of the piston within the cylinder liner, the packing 15 between the liner and the cylinder may allow some looseness or play to occur between the liner and cylinder, particularly when this packing becomes slightly worn. In such case the applied pressure may be readily increased while the pump is operating and under pressure merely by imparting a blow to the wedge element 23. If it becomes necessary to replace the pin 20 for any reason whatever, this may be readily accomplished by removing the wedge element 23 and then unbolting the cylinder head plate 16 whereby the pin 20 may be removed and replaced. This can be done at the point where the pump is located in the field and without the necessity of returning the cylinder head assembly to a shop for repair. In the case where threaded bolts are employed for applying the pressure to the retaining plate, it is usually necessary to send the complete cylinder head assembly into the shop in order to replace or repair such bolts.

The device comprises a very simple and efficient means for maintaining the desired pressure on the end of a cylinder liner so that said liner is retained within its cylinder. Any wear on the packing 15 may be readily compensated for by merely moving the wedge element 23 inwardly between the bracket 24 and the end of the pin. The single retaining pin 20 which has a smooth cylindrical surface is easily packed off by the packing rings 21 so that no leakage of pressure therearound will occur. The force applied to the retaining cage 18 is applied at the center thereof whereby an equal force around the annulus of the liner is maintained to hold the liner in proper position within its cylinder.

The foregoing disclosure and description of the invention is illustrative and explanatory thereof, and various changes in the size, shape and materials, as well as in the details of the illustrated construction may be made, within the scope of the appended claims, without departing from the spirit of the invention.

Having described the invention, I claim:

1. A retaining device assembly for the liner of a cylinder comprising, a cylinder head plate adapted to be secured to the end of the cylinder within which the liner is disposed, a retaining pin slidably mounted within the plate, a bracket secured to the exterior of the plate and having a portion which is in overhanging spaced relation to the outer end of the pin, movable wedge means insertable between the outer end of the pin and the overhanging portion of the bracket for applying an inward force to said pin, and means within the cylinder engageable by the pin and also engageable with the liner for transferring the inward force from said pin to the liner.

2. A retaining device assembly for the liner of a cylinder comprising, a cylinder head plate adapted to be secured to the end of the cylinder within which the liner is disposed, said plate having an opening therethrough, a retaining pin slidable through said opening with its inner end adapted to be disposed within the cylinder and its outer end located exteriorly thereof, a bracket secured to the exterior of the plate and having a portion overlying the outer end of the pin in spaced relation thereto, and a wedge element insertable between the outer end of the pin and the inner surface of the overlying portion of the bracket for moving the pin inwardly with respect to the cylinder to which the plate is secured.

3. A retaining device assembly for the liner of a cylinder comprising, a cylinder head plate adapted to be secured to the end of the cylinder within which the liner is disposed, said plate having an opening therethrough, a retaining pin slidable through said opening with its inner end adapted to be disposed within the cylinder and its outer end located exteriorly thereof, a bracket secured to the exterior of the plate and having a portion overlying the outer end of the pin in spaced relation thereto, and a wedge element insertable between the outer end of the pin and the inner surface of the overlying portion of the bracket for moving the pin inwardly with respect to the cylinder to which the plate is secured, the wedge element being movable in a plane transversely of the axis of the pin and having its surfaces coacting with those surfaces of the pin and bracket which are engaged by said element.

4. A retaining device assembly as set forth in claim 2, together with packing means mounted in the plate and in sealing engagement with the pin for sealing off around said pin.

5. A retaining device assembly as set forth in claim 3, together with packing means mounted in the plate and in sealing engagement with the pin for sealing off around said pin.

6. A retaining device assembly for maintaining a liner within a cylinder including, a cylinder head plate adapted to be secured to the end of the cylinder within which the liner is disposed, said plate having an opening disposed axially therein, a retaining pin slidable within said opening with its inner end projecting into the cylinder when the plate is attached thereto, the outer end of the pin being flat and projecting outwardly from the plate, an angular bracket secured to the exterior of the plate and having a portion thereof disposed in overlying relationship to and spaced from the flat outer end of the pin, the inner surface of the bracket which faces the flat end of the pin being inclined with respect to the end surface of said pin, and a wedge element insertable between the outer end of the pin and the bracket and having surfaces complementary to and coacting with the inner surface of the bracket and the end surface of the pin, whereby as said wedge element is moved between the bracket and pin, a movement of the pin in a direction inwardly of the cylinder is effected.

7. A retaining device assembly as set forth in claim 6, together with packing means within the opening in the plate and surrounding the pin for sealing off around said pin.

References Cited in the file of this patent

UNITED STATES PATENTS

| | | |
|---|---|---|
| 1,510,042 | Clewett | Sept. 30, 1924 |
| 1,584,843 | Carroll | May 18, 1926 |
| 2,282,254 | Shimer | May 5, 1942 |
| 2,640,434 | Leman | June 2, 1953 |
| 2,650,868 | Waldron | Sept. 1, 1953 |
| 2,665,178 | Hammer et al. | Jan. 5, 1954 |

FOREIGN PATENTS

| | | |
|---|---|---|
| 167,253 | Switzerland | May 1, 1934 |